(12) United States Patent
Jääskeläinen et al.

(10) Patent No.: US 7,220,812 B2
(45) Date of Patent: May 22, 2007

(54) PROPYLENE POLYMER RESIN WITH IMPROVED PROPERTIES

(75) Inventors: Pirjo Jääskeläinen, Porvoo (FI); Marijke Verpoest, Sint-Lievens-Houtem (BE); Bert Broeders, Heusden (BE); Helge Grande, Heusden (BE)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 11/191,192

(22) Filed: Jul. 27, 2005

(65) Prior Publication Data

US 2005/0261415 A1 Nov. 24, 2005

Related U.S. Application Data

(62) Division of application No. 10/482,597, filed as application No. PCT/EP02/07083 on Jun. 26, 2002.

(30) Foreign Application Priority Data

Jun. 27, 2001 (EP) .................................. 01115470

(51) Int. Cl.
*C08F 210/06* (2006.01)
*C08F 210/16* (2006.01)

(52) U.S. Cl. .......................... 526/348; 526/65; 525/53; 525/240; 428/364

(58) Field of Classification Search ................ 526/65, 526/348; 525/53, 240
See application file for complete search history.

(56) References Cited

U.S. PATENT DOCUMENTS 6,593,442 B2  7/2003  Bidell et al.

FOREIGN PATENT DOCUMENTS

| EP | 115940 | * | 8/1984 |
|---|---|---|---|
| EP | 0 115 940 | | 12/1986 |
| EP | 0 887 381 | | 12/1998 |
| EP | 0 887 380 | | 2/2004 |
| WO | WO 01/04166 A1 | | 1/2001 |

OTHER PUBLICATIONS

European Search Report correspondence to International Application No. PCT/EP02/07083.
Bond, Eric B., et al., Article titled *The Effects of Atacticity, Comonomer Content, and Configurational Defects on the Equilibrium Melting Temperature of Monoclinic Isotactic Polypropylene*, Journal of Applied Polymer Science, vol. 81, 229-236 (2001).

* cited by examiner

*Primary Examiner*—Roberto Rabago
(74) *Attorney, Agent, or Firm*—Fay Sharpe LLP

(57) ABSTRACT

The present invention relates to a process for the production of a propylene polymer in a multistage polymerisation process comprising the polymerisation of propylene in the presence of a catalyst in a first reaction zone comprising at least one slurry reactor to give a first polymerisation product, transferring said first product to a second reaction zone comprising at least one gas phase reactor and continuing polymerisation of propylene in the gas phase in the presence of said first polymerisation product which is characterised in that the temperature in both the slurry and the gas phase reactor is at least 75° C. and the product of at least one reactor is having an ethylene content in the range of 0.05 to 0.5 wt. %. Furthermore, the invention relates to a propylene polymer obtainable by the inventive process, to a propylene polymer which is characterised in that it comprises ethylene comonomer in an amount of 0.05 to 0.5 wt. %, is having a xylene solubles contents of 3.0 wt. % or less and is having a maximum in its temperature rising elution fractionation (TREF)-function at 120° C. or less, and to articles such as fibres, non-wovens, films and sheets comprising the inventive polymer.

12 Claims, 4 Drawing Sheets

PROPYLENE POLYMER RESIN WITH IMPROVED PROPERTIES

This divisional application claims priority from and benefit of the filing date of co-pending U.S. patent application Ser. No. 10/482,597 filed May 27, 2004, which application is the U.S. National Phase of International Application No. PCT/EP02/07083 filed Jun. 26, 2002 (International Publication Number WO 03/002626), which claims priority from and benefit of the filing date of European Patent Application No. 01115470.5 filed Jun. 27, 2001. The specification of U.S. patent application Ser. No. 10/482,597 is hereby incorporated herein in its entirety.

The present invention relates to a propylene polymer resin with improved bonding properties, improved stretching properties and improved thermoforming properties and a process for the production of such a resin. Furthermore, the present invention relates to a fibre comprising such a resin and a non-woven fabric comprising such fibres, to a film, especially a bioriented film, comprising such a resin and to a sheet, especially for thermoforming, comprising such a resin.

Non-woven fabrics are porous sheets which are produced by fibres forming a web. In the production of non-woven fabrics from polypropylene fibres usually in a first step a propylene polymer composition comprising further components, such as an antioxidant or an acid scavenger, is melt extruded at temperatures of above 200° C. Fibres are then spun by passing the melt through a spinnerette, quenching and winding up the produced fibres. Optionally, after quenching one or more stretching steps are applied to the fibres. Such spinning processes today are carried out at high speed in the order to 1000 nm/min up to 4000 m/min but still an increase of line speed and output is desirable due to economic reasons.

Non-woven fabrics are then produced from the polypropylene fibres either in the form of filaments or stapled fibres by forming a web, usually followed by a final bonding step wherein the fibres are bound together to increase the strength of the web. This bonding step usually is performed by applying heat and pressure to the web by passing the web through a calendar. When staple fibres are used the web forming usually comprises a carding step.

The bonding process affecting the fibre surface happens within a very short time and temperature window. Thus, in the production of thermal bonded non-woven fabrics the bonding step is limiting the maximum line speed. Consequently, an improvement of the bonding properties of the fibres which results in an improvement of the bonding step, e.g. with respect to the maximum line speed, is desirable.

Further, also the mechanical properties of the non-woven fabric depend on the bonding properties of the fibres and thus, better bonding properties of the fibres lead to improved mechanical properties, in particular mechanical strength, of the non-woven fabric.

It is therefore an object of the present invention to provide a propylene polymer for the production of polypropylene fibres with improved bonding properties.

It is known that by broadening the molecular weight distribution of a propylene polymer small improvements of the bonding properties of fibres comprising such polymer can be obtained. Further, it is known that higher crystallinity of a polymer used for the production of fibres negatively effects the bonding properties.

U.S. Pat. No. 5,281,378 describes an improvement in bonding properties of fibres due to a combination of an optimised molecular weight distribution of the polymer and a delayed quenching during fibre spinning.

In the production of films, the use of polypropylene resins is well known. The mechanical and optical properties of such a film which are crucial for its applicability are mainly determined by the properties of the resin used for film production. In particular, it is desired that the film shows good stretching behaviour, especially if the film is biaxially oriented after its production e.g. by casting.

It is therefore a further object of the present invention to provide a propylene polymer for the production of a polypropylene film with improved mechanical, especially stretching, properties.

It is further known to use sheets comprising polypropylene resins for the production of articles by thermoforming processes. In these processes the thermoforming properties of the sheets are mainly determined by the resin used for the sheet production.

It is therefore a further object of the present invention to provide, a propylene polymer for the production of a polypropylene sheet with improved thermoforming properties.

The present invention is based on the finding that a propylene polymer achieving the above-given objects can be obtained by a process in which the polymerisation of propylene is carried out at elevated temperature and in the presence of small amounts of ethylene.

The present invention therefore provides a process for the production of a propylene polymer in a multistage polymerisation process comprising the polymerisation of propylene in the presence of a catalyst in a first reaction zone comprising at least one slurry reactor to give a first polymerisation product, transferring said first product to a second reaction zone comprising at least one gas phase reactor and continuing polymerisation of propylene in the gas phase in the presence of said first polymerisation product characterised in that the temperature in both the slurry and the gas phase reactor is at least 75° C. and the product of at least one reactor is having an ethylene content in the range of 0.05 to 0.5 wt. %.

In a preferred embodiment there is a temperature difference between the slurry and the gas phase reactors so that in the gas phase reactor the temperature is higher than in the slurry reactor.

Preferably, the temperature in the gas phase reactor is at least 3° C. and more preferably at least 5° C. higher than in the slurry reactor.

Preferably, the temperature in both slurry and gas phase reactor is at least 80° C.

In a particularly preferred embodiment the temperature in the slurry reactor is around 80° C. and the temperature in the gas phase reactor is about 85° C.

Further, the present invention provides a propylene polymer characterised in that it comprises ethylene comonomer in an amount of 0.05 to 0.5 wt. %, is having a xylene soluble (XS) content of 3.0 wt. % or less and is having a maximum in its temperature rising elution fractionation (TREF)-function at 120° C. or less.

The "TREF-function" of the polymer shows the eluted weight fraction of the polymer plotted as a continous function of the elution temperature according to the procedure as given in the Examples section.

The inventive process and the inventive polymer allow the production of polypropylene fibres having improved bonding properties so that non-woven fabrics comprising such fibres can be produced with higher bonding speed and/or with improved mechanical properties, in particular mechanical strength. The present invention also relates to these fibres.

The inventive process and the inventive polymer allow the production of polypropylene films having improved mechanical, especially stretching, properties so that e.g. biaxially oriented films with improved properties can be produced. The present invention also relates to these films.

Further, the inventive process and the inventive polymer allow the production of polypropylene sheets having improved thermoforming properties so that the production of articles by thermoforming is improved; The present invention also relates to these sheets.

Furthermore, the present invention relates to a process for the production of a non-woven fabric which is characterised in that it comprises forming a web comprising the inventive fibres and bonding the web, as well as to a non-woven fabric comprising the inventive fibres.

Such webs and hence non-wovens may be produced either by staple fibres, i.e. fibres which have been stapled after their production, or filaments as e.g. continous filaments. The term "fibres" as used herein is intended to cover both staple fibres and filaments.

The bonding of the fibres in the fibrous web upon which the non-woven is based gives strength to the web and influences its properties in general. One widely used method of bonding such fibrous webs is by means of heat. Manufacturing methods for non-wovens are described in a variety of publications, for example "The Nonwovens Handbook" (The Association of the Nonwoven Industry, 1988) and the "Encyclopaedia of Polymer Science and Engineering", Volume 10, Nonwoven fabrics (John Wiley and Sons, 1987).

The properties of polypropylene are dependent on the degree of crystallinity and lamellae size distribution. It is known that high yield Ziegler-Natta catalyst has a tendency to concentrate stereodefects into the low molar mass chains leading to a broad tacticity distribution and intermolecular heterogeneity of polypropylene (L. Paukkeri et. al., Polymer, 1993, 34, 2488–2494) leading also to an increased amount of xylene solubles.

From a material point of view the distribution of stereodefects is a more important parameter than the total isotacticity. Good (random) defect distribution means more even (narrower) isotactic sequence length distribution and lower amount of xylene solubles.

By changing polymerisation conditions (in particular temperature) it is possible to control—to some extent—the relative amount and average length of isotactic and atactic sequences. The random distribution of stereodefects corresponds to a lower average length of perfectly isotactic sequences compared to the case in which such stereodefects are segregated in isotactoid blocks.

The average length of isotactic sequences can also be influenced by the controlled incorporation of co-monomeric units acting as sterical defects in the polymer chain.

For the determination of the isotacticity distribution, the TREF method can be applied. TREF is a common method to fractionate polyolefins according to their solubility differences. The solubility of a polypropylene polymer chain is influenced only by the concentration of sterical defects. It has been demonstrated for polypropylene that TREF fractograms qualitatively reflect the distribution of isotacticity. The average length of isotactic chains increases almost linearly with increasing elution temperature (P. Ville et al., Polymer 42 (2001) 1953–1967). The results further showed that TREF does not strictly fractionate polypropylene according to tacticity but according to the longest crystallisable sequences in the chain.

According to the invention it has been found that the inventive process provides for an even ethylene comonomer distribution in the inventive propylene polymer. These ethylene comonomers act as sterical defects and hence interrupt the sequence of isotactic propylene monomers. Thus, by an even distribution of the ethylene comonomers an even distribution of sterical defects is obtained, i.e. it is possible by the inventive process to tailor the defect distribution and hence the isotacticity distribution of the polypropylene polymer.

As a consequence, a narrower sequence length distribution of the isotactic propylene monomer sequences is obtained. Hence, on the one hand, a lower amount of xylene solubles which predominantly comprise polymer chains with small isotactic propylene sequence lengths, and, on the other hand, a lower amount of polymer chains with long isotactic propylene sequence lengths are obtained. This, in turn, leads to an improvement of the bonding properties of fibres comprising such propylene polymer due to e.g. an even melting point of the polymer and tailored isotacticity.

The bonding properties of the fibres are measured via the measurement of the bonding index (BI) of the produced non-woven fabric which is defined as the square root of the product of the bonding strength in the machine direction (MD) and in the cross-direction (CD) quoted as N/5 cm:

$$BI = \sqrt{CD \cdot MD}$$

As the strength in the machine direction (parallel to the movement of the web/non-woven) is often different from the cross directional strength, the bonding index is a function of both of these. In optimal instances, the ratio between the MD strength and the CD strength is around unity.

Further, the bonding window is defined the temperature interval in which a bonding index in the non-woven is obtained which differs from the maximum bonding index $BI_{max}$ obtained at optimum bonding temperature by not more than 15%. In case of a typical good quality non-woven for use e.g. in hygienic absorbent products this corresponds to a difference in the bonding index of about 3 N/5 cm compared to $BI_{max}$.

A broad bonding window gives the producer of non-woven fabrics a better possibility of obtaining a uniform product even when using a calendering system with temperature variation over the calender surface or when using a higher bonding speed or lower bonding temperature. This is a considerable advantage for the non-woven producer.

"Slurry reactor" designates any reactor such as a continuous or simple batch stirred tank reactor or loop reactor operating in bulk or slurry, including supercritical conditions, in which the polymer forms a particulate form.

The inventive process is a multistage processes for the production of propylene polymers. Such processes are described in EP 0 887 379, for example. The contents of this document is herein included by reference.

As catalyst, all kind of chemical compounds suitable for the polymerisation of propylene can be used as e.g. Ziegler-Natta, and single-site catalysts such as metallocene catalysts. If single-site catalysts are used, those described in WO 95/12622 and WO 00/34341 are preferred.

In a preferred embodiment, a Ziegler-Natta-type catalyst system comprising a catalyst component, a co-catalyst component and an external electron donor is used. Such catalyst systems are described in, for example, U.S. Pat. No. 5,234,879, WO 92/19653, WO 92/19658 and WO 99/33843.

The used external donors are preferably silane based donors, especially di-cyclopentyldimethoxysilane (donor D).

Optionally, the main polymerisation stages may be preceded by a prepolymerisation, in which up to 10% by weight, preferably 0.1–10% by weight and most preferred 0.5 to 5% by weight of the total amount of the polymer is produced.

In a preferred embodiment of the inventive process both the product produced in the slurry and that produced in the gas phase reactor is having an ethylene content in the range of 0.05 to 0.5 wt. %.

Further preferred, the ethylene content of the product produced in at least one of the reactors is in the range of 0.15 to 0.4 wt. % and most preserved is around 0.3 wt. %. These preferred and most preferred values also apply for the ethylene content of both products in the preferred process embodiment in which in both slurry and gas phase reactor a product comprising ethylene is produced.

Further preferred, in the inventive process the slurry reactor is a bulk reactor. "Bulk" means a polymerisation in an reaction medium comprising at least 60 wt. % monomer.

Preferably, the bulk reactor is a loop reactor.

Preferably, in the inventive process the production split between the slurry reactor and the gas phase reactor is from 70:30 to 40:60, more preferred from 60:40 to 50:50.

It is further preferred that the reaction temperature in both reactors is 100° C. or less, more preferably 95° C. or less.

The inventive propylene polymer preferably is produced in a process, including the preferred embodiments, as described above.

As outlined above, the present invention provides a propylene polymer characterised in that it comprises ethylene comonomer in an amount of 0.05 to 0.5 wt. %, is having a xylene soluble (XS) contents of 3.0 wt. % or less and is having a maximum in its temperature rising elution fractionation (TREF)-function at 120° C. or less.

The term "xylene solubles" (XS) designates the fraction of the polymer soluble in xylene, determined to the procedure as outlined in the Examples section.

In a preferred embodiment the inventive propylene polymer is characterised in that the xylene solubles content is 2.5 wt. % or less.

It is further preferred that the propylene polymer is having a maximum in its temperature rising elution fractionation (TREF)-function at 118° C. or less and still more preferred at 115° C. or less.

Further preferred the inventive propylene polymer comprises ethylene comonomer in an amount of 0.15 to 0.4 wt. %, still more preferred in an amount of around 0.3 wt. %.

Preferably, the inventive propylene copolymer has a melt flow rate $MFR_2$ of 1 to 50 g/10 min, more preferred of 5 to 20 g/10 min and most preferred of 10 to 16 g/10 min measured according to ISO 1133 (230° C., 2.16 kg load).

The molecular weight distribution (MWD) of the polymer material preferably is in the range of 2 to 7, more preferably 4 to 6.

The propylene polymer obtained according to the inventive process usually has a high degree of isotacticity.

Preferably, the fibres comprising the inventive propylene polymer have a bonding index of 20 or more, more preferred of 21.5 or more and most preferred of 23 or more in a non-woven fabric.

Further preferred, the polymer has a degree of crystallinity from 40 to 60%, more preferred from 48 to 60% and most preferred from 50 to 57%. Crystallinity is determined in accordance with two ISO 11357-03 and a scientific background is given in A. P. Grey, Thermal Chimica Acta 1970, 1, page 563.

In the production of non-woven fabrics comprising the inventive fibres the bonding process preferably is performed at a speed of at least 150 m/min, more preferably of at least 200 m/min and most preferably at least 250 m/min.

Bonding preferably is performed by thermal bonding, e.g. calendar bonding or hot air bonding, infrared bonding or ultrasound bonding. Further preferred, bonding is performed by thermal bonding preferably in a calendar.

In the following, a preferred embodiment of the inventive process and copolymer will be illustrated by means of examples with reference to the enclosed figures.

EXAMPLES

Figure 1:
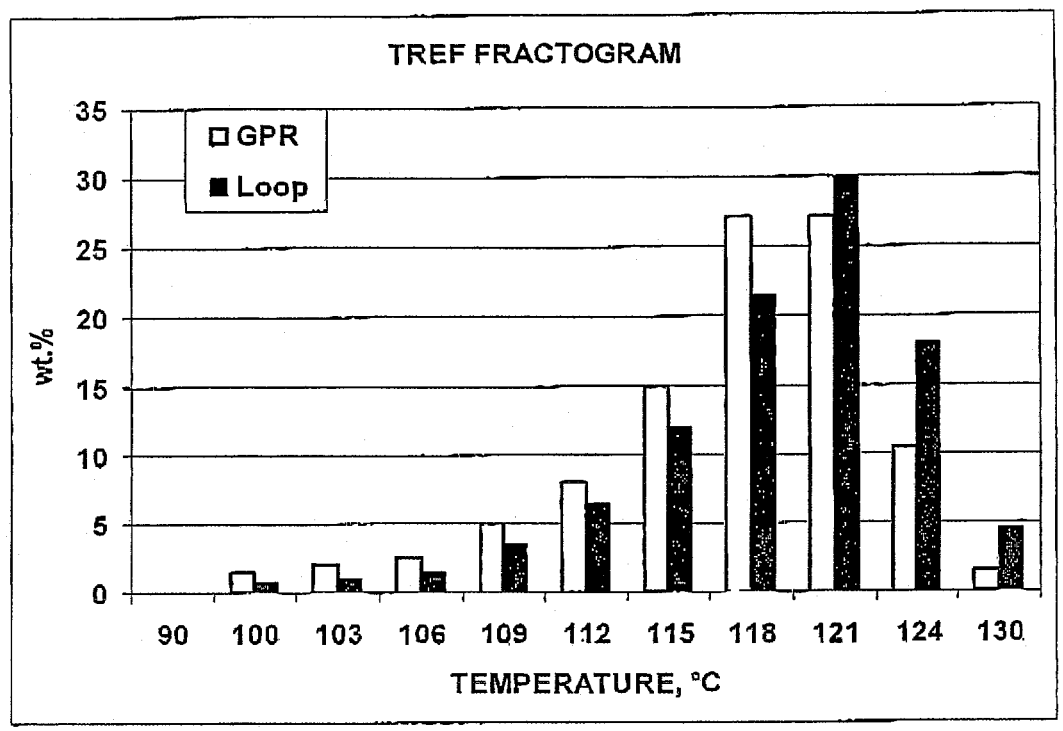
FIG. 1 shows a TREF fractogram of the final polymer (GPR) according to the invention (Example 1) and of that produced in the loop reactor only.

1) Measuring Methods a) TREF-Method:

Fractionation of the polypropylene samples was achieved by using analytical TREF. The TREF profiles were generated using a home made instrument, which is similar to a published design (Wild, L., Trends Polym Sci. 1993, 1, 50).

The sample was dissolved in xylene (2–4 mg/ml) at 130° C. and injected into the column at 130° C., and the latter was then cooled to 20° C. at a rate of 1.5 K/h. The column was subsequently eluted with 1,2,4-trichlorobenzene (TCB) at a flow rate of 0.5 ml/min while the temperature was increased from 20° C. to 130° C. over 4.5 h. The output, detected with an i.r. detector operating at a wavelength of 3.41 μm, was presented as a fractogram normalised to constant area.

b) Xylene Solubles (XS):

For the determination of the xylene solubles fraction, 2.0 g of polymer is desolved in 250 ml p-xylene at 135° C. under agitation. After 30±2 min the solution is allowed to cool for 15 min at ambient temperature and then allowed to settle for 30 min at 25±0.5° C. The solution is filtered with filter paper into two 100 ml flasks.

The solution from the first 100 ml vessel is evaporated in nitrogen flow and the residue is dried under vacuum at 90° C. until constant weight is reached. The xylene soluble fraction is calculated using the following equation:

$$XS\% = (100 \cdot m_1 \cdot v_0)/(m_0 \cdot v_1)$$

wherein $m_0$ = initial polymer amount (g),
$m_1$ = weight of residue (g),
$v_0$ = initial volume (ml),
$v_1$ = volume of analysed sample (ml).

c) $M_w/M_n$ $M_w/M_n$ was determined using gel permeation chromatography (GPC) at 130° C. As an eluent, 1,2,4-trichlorobenzene (TCB) was used.

d) Melt Flow Rate (MFR)

$MFR_2$ was measured according to ISO 1133 at 230° C. and a load of 2.16 kg.

e) Thermal Properties

Melting temperature $T_m$, crystallisation temperature $T_{cr}$, and the degree of crystallinity were measured with a Mettler TA820 differential scanning calorimetry (DSC) on 3±0.5 mg samples. Both crystallisation and melting curves were obtained during 10° C./min cooling and heating scans between 30° C. and 225° C.

Melting and crystallisation temperatures were taken as the peaks of endotherms and exotherms. The degree of crystallinity was calculated by comparison with heat of fusion of a perfectly crystalline polypropylene, i.e. 209 J/g.

2) Propylene Polymer Production

Example 1

Invention

Continous multistage process was used to produce propylene (co)polymer. The process comprised a prepolymerisation step, a first polymerisation stage carried out in a loop reactor and a second polymerisation stage carried out in a fluidized bed gas phase reactor.

As a catalyst, a highly active, stereospecific transesterified $MgCl_2$-supported Ziegler-Natta catalyst prepared according to U.S. Pat. No. 5,234,879 at a titanization temperature of 135° C. was used. The catalyst was contacted with the cocatalyst (triethylaluminium, TEAL) and the external donor which was dicyclopentyl dimethoxysilane with a Al/Ti ratio of 200 and a Al/D ratio of 10, to yield the catalyst system.

The catalyst system and propylene were fed into the prepolymerisation reactor which was operated at 30° C. The prepolymerised catalyst was used in the subsequent polymerisation reactors.

Propylene, ethylene and hydrogen and the prepolymerised catalyst were fed into the loop reactor which was operated as bulk reactor at 80° C. at a pressure of 55 bar.

Then, the polymer slurry stream was fed from the loop reactor into the gas phase reactor which was operated at 85° C. and a pressure of 20 bar. More propylene, ethylene and hydrogen were fed into the gas phase reactor to control the desired properties of the final polymer.

The production split between loop and gas phase reactor was 60:40.

The polymer was melt homogenised and additivated as normal with 1300 ppm of antioxidants and UV stabiliser.

Example 2

Comparative

The same production procedure as in Example 1 was used except the process comprised two loop reactors instead of a loop and a gas phase reactor and no ethylene was fed to the process. Operation temperature in both reactors was 70° C. The catalyst system used was the same as in example 1 except that as an external donor cyclohexylmethyl dimethoxysilane was used.

Additivation of the comparative polymer was the same as in Example 1.

3) Spinning Process/Web Formation

The polypropylene polymers produced according to 2) were used for fibre and subsequent non-woven production.

An ESL-pilot conventional spinning line was used to produce staple fibres. The spinning temperatures were in the range of 270–285° C. During spinning, the $MFR_2$ of the propylene fibres increased to approx. 40 g/10 min due to thermal degradation.

The fibres had a fineness of 2.2 dTex. The fibres were texturised to a level of about 12 crimps/cm and cut to 40 mm staple fibres.

Non-woven fabrics were produced using a Hergeth monolayer/Kusters calender having a width of 600 mm. The winder speed of the process line was 100 m/min. The produced web was a web having a weight of 20 gram per square meter.

4) Results

Figure 2:
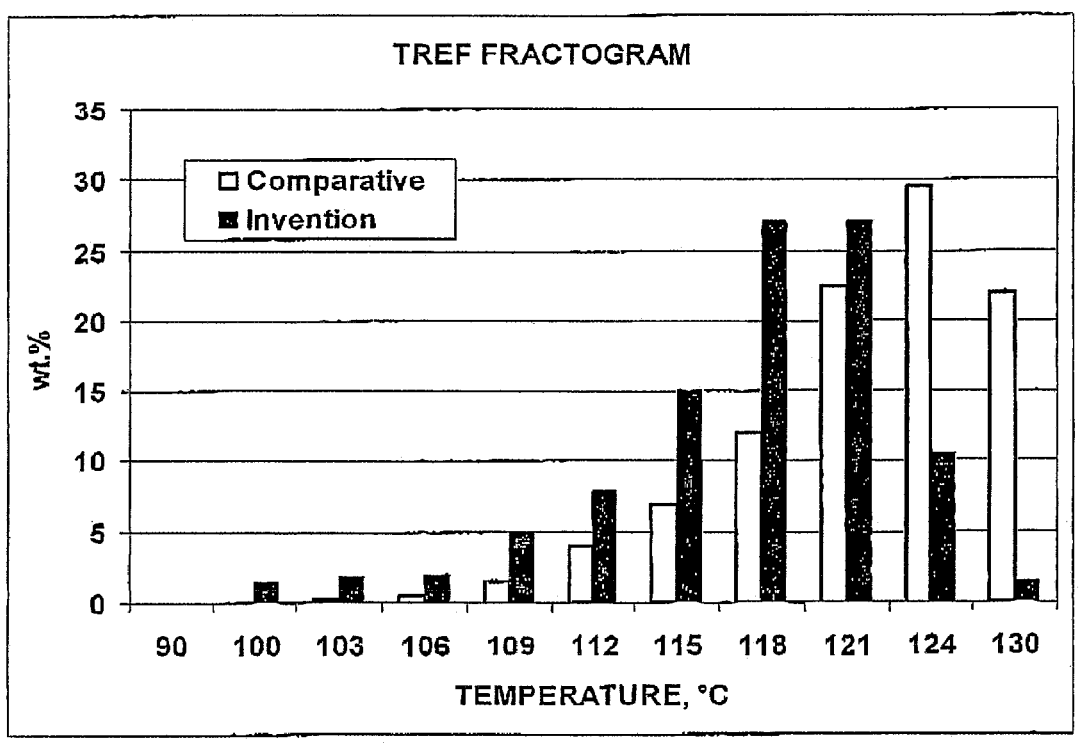
FIG. 2 shows a TREF fractogram of the polymer according to the invention (Example 1) and of the comparative polymer (Example 2).
Figure 3:
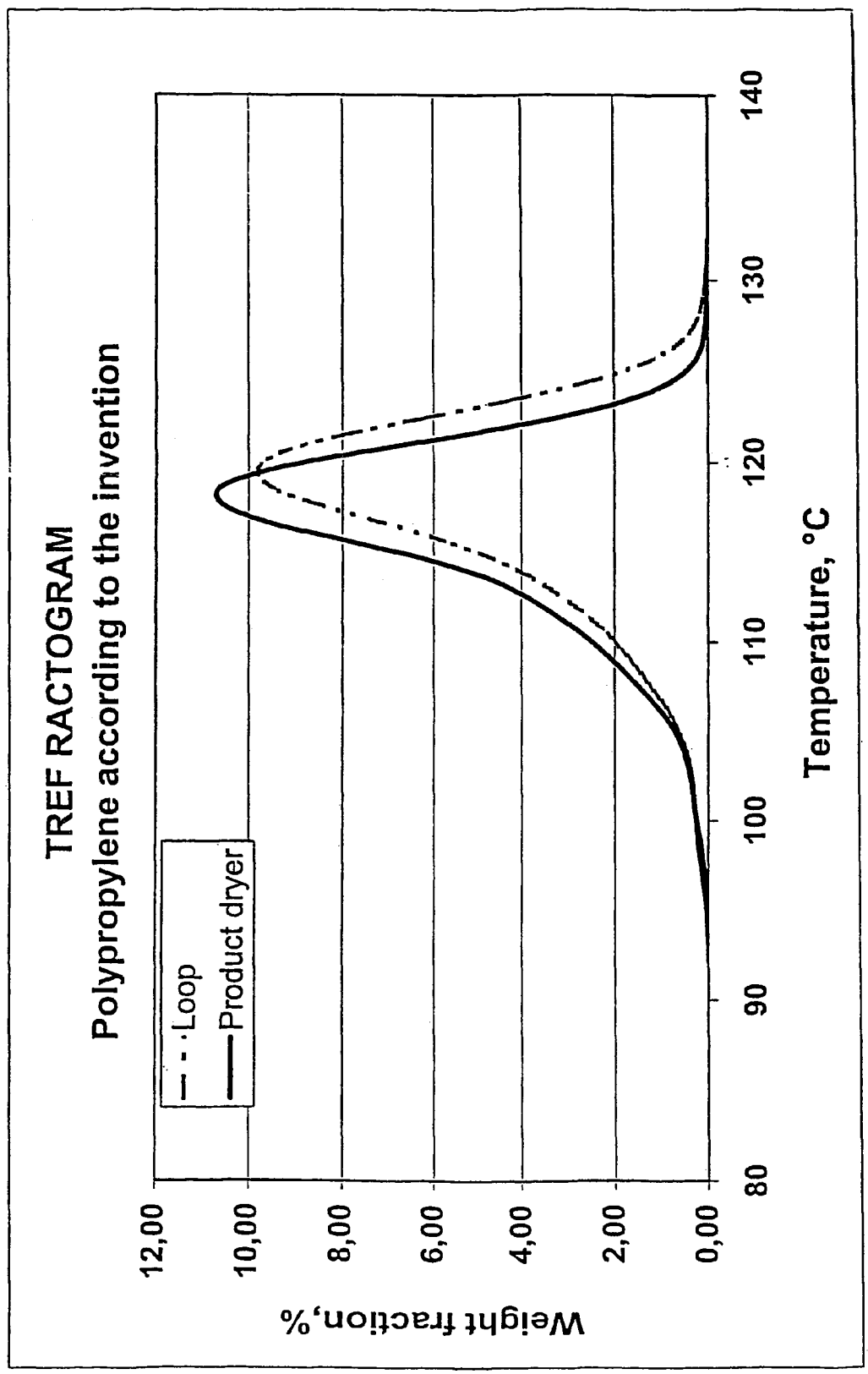
FIG. 3 shows the TREF-function of the final polymer (GPR) according to the invention (Example 1) and of that produced in the loop reactor only calculated from the results given in FIG. 1.
Figure 4:
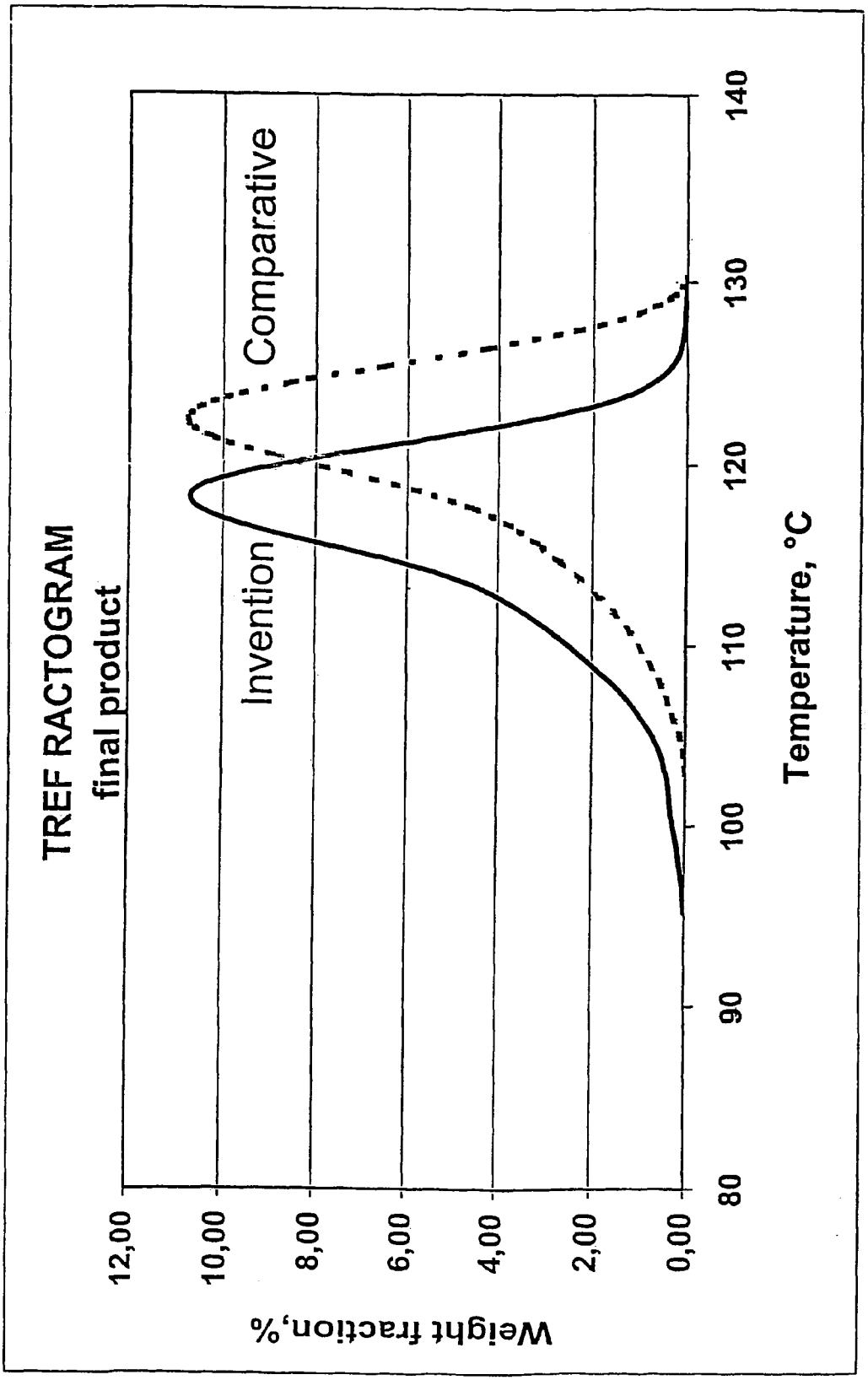
FIG. 4 shows the TREF-function of the polymer according to the invention (Example 1) and of the comparative polymer (Example 2) calculated from the results given in FIG. 2.

The results of the examples performed are shown in FIG. 1 to 4 and Tab. 2 which show the results of the TREF analysis of the polypropylene polymers and Tab. 1 which shows further properties of the polymers and the produced fibres/non-wovens.

TABLE 1

Polymer and fibre/non-woven properties

| Sample | Unit | Invention | Comparative |
| --- | --- | --- | --- |
| Ethylene | wt. % | 0.17 | 0.0 |
| $MFR_2$ | g/10 min | 13.0 | 13.6 |
| XS | wt. % | 1.6 | 3.6 |
| $T_m$ of PP | ° C. | 162 | 162.5 |
| crystallinity | % | 53.5 | 47.6 |
| $T_{cr}$ of PP | ° C. | 118.4 | 116 |
| $M_n$ | | 51100 | 55350 |
| $M_w$ | | 264000 | 259000 |
| $M_z$ | | 682500 | 665500 |
| $M_w/M_n$ | | 5.2 | 4.7 |
| Spinning speed | | 1800 | 1800 |
| Bonding index | | 23.6 | 19.4 |

TABLE 2

Results of TREF analysis

| TREF | Unit | Invention | | Comparative |
| --- | --- | --- | --- | --- |
| | | loop | gas phase (final) | (final) |
| <103° C. | wt. % | 1.7 | 3.2 | 0.1 |
| <112° C. | wt. % | 14 | 19 | 6 |
| <118° C. | wt. % | 47 | 61 | 26 |

The invention claimed is:

1. A propylene polymer characterised in that it comprises ethylene comonomer in an amount of 0.05 to 0.5 wt. %, and has a xylene solubles contents of 3.0 wt. % or less and has a maximum in its temperature rising elution fractionation (TREF)-function at 120° C. or less.

2. A propylene polymer according to claim 1 characterised in that the xylene solubles contents is 2.5 wt. % or less.

3. A propylene polymer according to claim 1 characterised in that it has a maximum in its temperature rising elution fractionation (TREF)-function at 118° C. or less.

4. A propylene polymer according to claim 1 characterised in that it comprises ethylene comonomer in an amount of 0.15 to 0.4 wt. %.

5. A propylene polymer according to claim 1 characterised in that it has a maximum in its temperature rising elution fractionation (TREF)-function at 115° C. or less.

6. The propylene polymer of claim 1 wherein the polymer has an even distribution of ethylene comonomer.

7. The propylene polymer of claim 1 wherein the polymer has an even distribution of sterical defects.

8. The propylene polymer of claim 1 wherein a molecular weight distribution of the polymer is 2 to 7.

9. The propylene polymer of claim 1 wherein a melt flow rate of the polymer is 1 to 50 g/10 mm.

10. The propylene polymer of claim 1 wherein a degree of crystallinity of the polymer is 40 to 60%.

11. A fiber comprising a propylene polymer defined in claim 1 having a bonding index of 20 or more.

12. A propylene polymer characterised in that it comprises ethylene comonomer in an amount of 0.05 to 0.5 wt. %, and has a xylene solubles contents of 3.0 wt. % or less, a maximum in its temperature rising elution fractionation (TREF)-function at 120° C. or less, and a degree of crystallinity of 50 to 60%.

* * * * *